United States Patent
Harke

(10) Patent No.: US 7,986,538 B2
(45) Date of Patent: Jul. 26, 2011

(54) MIDPOINT CURRENT AND VOLTAGE REGULATION OF A MULTI-LEVEL CONVERTER

(75) Inventor: Michael C. Harke, Madison, WI (US)

(73) Assignee: Hamilton Sundstrand Corporation, Rockford, IL (US)

( * ) Notice: Subject to any disclaimer, the term of this patent is extended or adjusted under 35 U.S.C. 154(b) by 412 days.

(21) Appl. No.: 12/156,679

(22) Filed: Jun. 3, 2008

(65) Prior Publication Data
US 2009/0295229 A1 Dec. 3, 2009

(51) Int. Cl.
*H02M 7/08* (2006.01)
*H02M 7/00* (2006.01)

(52) U.S. Cl. .................. 363/67; 363/84; 363/125

(58) Field of Classification Search .......... 363/67, 363/84, 89, 125, 127
See application file for complete search history.

(56) References Cited

U.S. PATENT DOCUMENTS

| | | | |
|---|---|---|---|
| 4,564,895 A | | 1/1986 | Glennon |
| 4,862,342 A * | | 8/1989 | Dhyanchand et al. ........ 363/40 |
| 5,930,134 A * | | 7/1999 | Glennon .................... 363/127 |
| 6,545,887 B2 * | | 4/2003 | Smedley et al. ............. 363/89 |
| 6,757,185 B2 * | | 6/2004 | Rojas Romero ............. 363/89 |
| 7,474,081 B2 * | | 1/2009 | Colombi et al. ............. 323/266 |
| 2002/0172058 A1* | | 11/2002 | Szczesny et al. ............ 363/40 |
| 2008/0298103 A1* | | 12/2008 | Bendre et al. ................ 363/89 |

OTHER PUBLICATIONS

Zhao et al., "Force Commutated Three Level Boost Type Rectifier", IEEE Transactions on Industry Applications, Jan./Feb. 1995, pp. 155-161, vol. 31, No. 1.
Wang et al., "Unity Power Factor Control for Three-Phase Three-Level Rectifiers Without Current Sensors", IEEE Transactions on Industry Applications, Sep./Oct. 2007, pp. 1341-1348, vol. 43, No. 5.
Burgos et al., "Space Vector Modulation for Vienna-Type Rectifiers Based on the Equivalence between Two- and Three-Level Converters: A Carrier-Based Implementation", Center for Power Electronic Systems (CPES), 2007, pp. 2861-2867.
Kolar et al., "A Novel Three-Phase Utility Interface Minimizing Line Current Harmonics of High-Power Telecommunications Rectifier Modules", Proc. IEEE-INTELEC, 1994, pp. 367-374.

(Continued)

*Primary Examiner* — Adolf Berhane
*Assistant Examiner* — Emily Pham
(74) *Attorney, Agent, or Firm* — Kinney & Lange, P.A.

(57) ABSTRACT

A controller for a multi-level converter regulates the DC midpoint voltage of the multi-level converter by accounting for the effect non-redundant switch states have on the DC midpoint current. The controller includes a DC bus regulator that monitors the DC output voltage and generates in response a commanded voltage vector. The duty cycle calculator is operably connected to receive the commanded voltage vector generated by the DC-bus regulator and to generate in response to the commanded voltage vector duty cycles associated with non-redundant switch states. The DC midpoint regulator is operably connected to receive the non-redundant duty cycles calculated by the duty cycle calculator and to generate in response a first midpoint current command that accounts for the effect the non-redundant switch states have on the midpoint current. Based, at least, in part, on the calculated effect the non-redundant switch states will have on the midpoint current, the DC midpoint regulator regulates the DC midpoint voltage of the multi-level rectifier to a desired value.

19 Claims, 9 Drawing Sheets

OTHER PUBLICATIONS

Kolar et al., "Space Vector Based Analysis of the Variation and Control of the Neutral Point Potential of Hysteresis Current Controlled Three-Phase/Switch/Level PWM Rectifier Systems", Proc. IEEE-PEDS, 1995, pp. 22-23, vol. 1.

Celanovic et al., "A Fast Space-Vector Modulation Algorithm for Multilevel Three-Phase Converters", IEEE Transactions on Industry Applications, Mar./Apr. 2001, pp. 637-641, vol. 37, No. 2.

Youssef et al., Real-Time Implementation of a Discrete Nonlinearity Compensating Multiloops Control Technique for a 1.5-kW Three-Phase/Switch/Level Vienna Converter, IEEE Transactions on Industry Applications, Mar. 2008, pp. 1225-1234, vol. 55, No. 3.

Alahuhtala et al., "Space Vector Modulated and Vector Controlled Vienna I Rectifier with Active Filter Function", IEEE, 2007, pp. 62-68.

* cited by examiner

MIDPOINT CURRENT AND VOLTAGE REGULATION OF A MULTI-LEVEL CONVERTER

BACKGROUND

The present invention relates generally to multi-level converters and in particular to control methods for controlling the operation of the multi-level converter.

Converters are employed in a variety of applications to convert direct current (DC) power to alternating current (AC) power and vice versa. A converter for DC-to-AC conversion is referred to as an inverter, while an AC-to-DC converter is referred to as a rectifier. Employing active components, such as transistors, allows for regulation of the voltages generated by the converter. Multi-level converters, for example, may be employed to generate two-level outputs in rectifier operations such that a positive DC output and a negative DC output are generated.

A Vienna-type rectifier is an example of a multi-level rectifier that provides a two-level DC bus with unidirectional power flow and power factor correction. In particular, the Vienna-type rectifier provides a reduced switch count realization of a three-phase, three-level AC-DC converter. Active components within the Vienna-type rectifier are selectively controlled to generate the desired DC voltage on both the positive and negative DC bus (i.e., the two-level DC bus).

Space vector modulation is a control scheme commonly used in conjunction with converters and has been applied to Vienna-type rectifiers. A space vector plot defines each combination of switch states associated with the Vienna-type rectifier. Each switch state defines a configuration of the active components or switches within the multi-level converter. Control of the multi-level converter requires the selective traversal of adjacent switch states in the space vector plot. Space vector modulation may be employed with a variety of multi-level converters, including Vienna-type rectifiers and Rockford-type rectifiers.

SUMMARY

An embodiment of the present invention provides a controller for controlling the operation of a multi-level rectifier that converts an alternating current (AC) input to a direct current (DC) output. The controller includes, among other things, a DC bus regulator, a duty cycle calculator, and a DC midpoint regulator. The DC bus regulator is operably connected to monitor the DC output voltage of the multi-level rectifier and to generate in response a commanded voltage vector. The duty cycle calculator is operably connected to receive the commanded voltage vector generated by the DC bus regulator and to generate in response to the commanded voltage vector duty cycles associated with non-redundant switch states. The DC midpoint regulator is operably connected to receive the non-redundant duty cycles calculated by the duty cycle calculator and to generate in response a first midpoint current command that accounts for the effect the non-redundant switch states have on the midpoint current. Based, at least in part, on the calculated effect the non-redundant switch states will have on the midpoint current, the DC midpoint regulator regulates the DC midpoint voltage of the multi-level rectifier to a desired value.

Another embodiment of the present invention provides a method of controlling the DC midpoint voltage of a multi-level rectifier. The method includes, among other possible steps: monitoring a direct current (DC) output voltage of the multi-level rectifier; generating in response to the monitored DC output voltage a commanded voltage vector; generating in response to the commanded voltage vector duty cycles associated with non-redundant switch states; estimating a midpoint current generated in response to the duty cycles associated with the non-redundant switch states; partitioning duty cycles associated with redundant switch states based, at least in part, on the estimated midpoint current; generating switching waveforms based on the duty cycles associated with the non-redundant switch states and the duty cycles associated with the redundant switch states; and applying the switching waveforms to active components within the multi-level rectifier.

Another embodiment of the present invention addresses a multi-level converter that includes a plurality of AC signal nodes, a plurality of DC signal nodes, including at least one intermediate DC voltage node, and a controller. The controller is operably connected to monitor the AC signals and the DC signals of the multi-level converter, including a voltage generated on the intermediate DC voltage node. The controller includes a duty cycle calculator that selects switching states, including both redundant and non-redundant switching states, based on the monitored AC signals and DC signals and partitions duty cycles associated with the non-redundant states based on the monitored AC signals and monitored DC signals. The controller further includes an intermediate DC regulator operably connected to receive the non-redundant duty cycles calculated by the duty cycle calculator and to estimate an intermediate current generated in response to the duty cycles of the non-redundant switch states. The intermediate DC regulator partitions the duty cycles associated with the redundant switch states based, at least in part, on the estimated intermediate current generated in response to the non-redundant switch states. The controller also includes a PWM waveform generator operably connected to receive the duty cycles associated with the non-redundant switch states and the duty cycles associated with the redundant switch states and to generate in response switching waveforms that are provided to active components within the multi-level converter.

DETAILED DESCRIPTION

A controller for a multi-level converter provides midpoint voltage regulation that takes into account the effect non-redundant states have on the midpoint current. In this way, the controller improves the midpoint voltage regulation of the multi-level converter and minimizes lossy harmonics.

Figure 1:
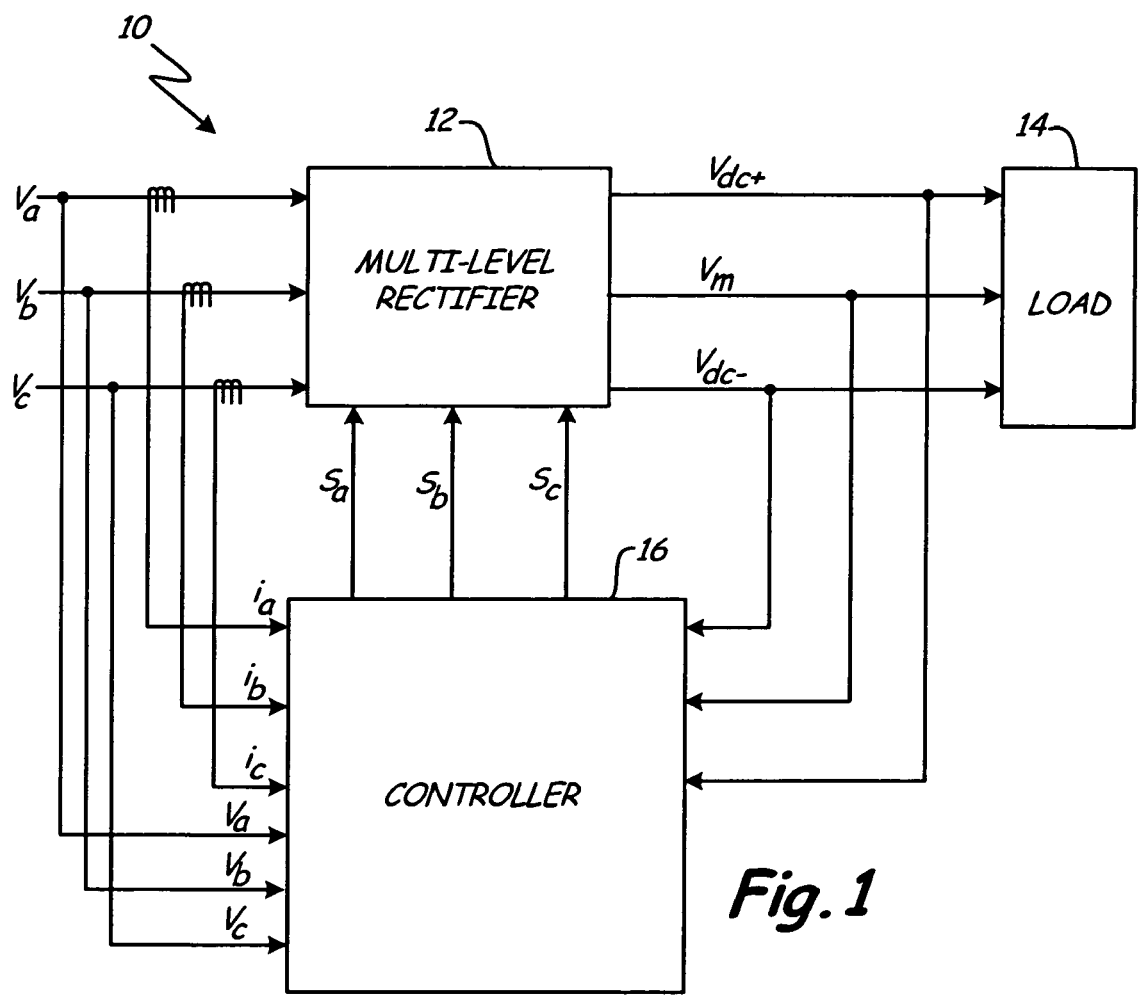
FIG. 1 is a block diagram of a power conversion system that includes an exemplary embodiment of a multi-level rectifier and controller of the present invention.

FIG. 1 is a block diagram of an exemplary embodiment of power conversion system 10 of the present invention, which includes multi-level rectifier 12, load 14, and controller 16. Multi-level rectifier 12 includes AC input nodes for receiving AC input voltages $v_a$, $v_b$, and $v_c$ provided by a source (not shown) and DC output nodes for providing DC output voltages $V_{dc+}$, $V_{dc-}$, and $V_m$ to a load 14. Controller 16 monitors the DC output voltages $V_{dc+}$, $V_{dc-}$, and $V_m$ as well as the AC input currents $i_a$, $i_b$, and $i_c$ and the AC input voltages $v_a$, $v_b$, and $v_c$, and in response generates switching waveforms $s_a$, $s_b$, and $s_c$ that are provided to active components (e.g., transistors, switches) within multi-level rectifier 12 to selectively control the DC output voltages. For instance, for a particular application the positive DC voltage $V_{dc+}$ may be maintained at a voltage of 400 Volts (V), the negative DC voltage $V_{dc-}$ may be maintained at a voltage of −400 V, and the midpoint voltage $V_m$ may be maintained at a voltage of approximately 0 V. In other exemplary embodiments, monitoring of the AC input nodes and the DC output nodes may make use of a variety of well-known monitoring schemes. For instance, rather than monitoring all three AC input voltages $v_a$, $v_b$, and $v_c$ individually, controller 16 may monitor the line-to-line and/or the line-to-neutral voltage at the AC input nodes. In other embodiments, other well known methods of monitoring the inputs and outputs of a multi-level converter may be employed.

Prior art controllers typically provide some form of regulation of the midpoint voltage. A commonly used method of controlling the midpoint voltage is to monitor the midpoint voltage and in response to selectively control the duty cycles of redundant states (switch states that result in the same voltage potential, but in which the midpoint current flows in the opposite direction) to increase or decrease the midpoint voltage. In this way, the prior art method of controlling the midpoint voltage simply reacts to the monitored midpoint voltage. Controller 16 of the present invention provides midpoint voltage regulation that includes the midpoint current generated as a result of each switch state such that the effects of the selected switch states can be accounted for when partitioning the redundant switch states. In an exemplary embodiment, controller 16 may also provide load current decoupling to improve the disturbance rejection of controller 16.

Figure 2:
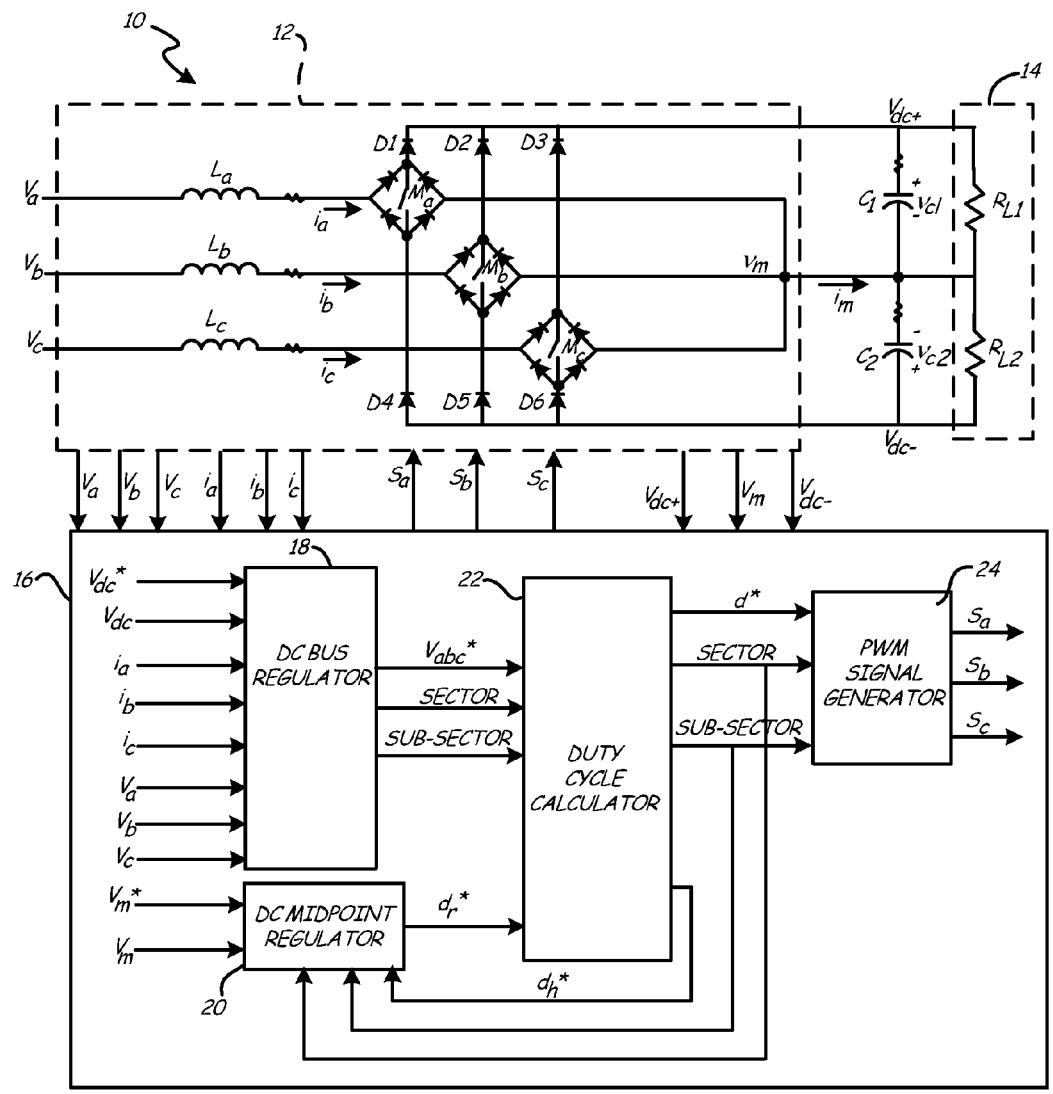
FIG. 2 is a block diagram illustrating in more detail the multi-level rectifier and controller of the present invention.

FIG. 2 is a block diagram illustrating in additional detail an exemplary embodiment of multi-level rectifier 12 and controller 16 of the present invention. In particular, FIG. 2 illustrates an exemplary embodiment of a multi-level rectifier commonly referred to as a Vienna-type rectifier. In other embodiments, other well-known types of multi-level converters, such as three-level neutral point clamped inverters, may be substituted for the Vienna-type rectifier illustrated here and the concept of including the effect of the selected switch states when determining the partitioning of the redundant switch states can be applied.

As shown in FIG. 2, multi-level rectifier 12 includes boosting inductors $L_a$, $L_b$, and $L_c$, active switches $m_a$, $m_b$, and $m_c$, each connected to a corresponding phase of AC power, diodes D1-D6, DC link charging capacitors C1 and C2 and load parameters $R_{L1}$ and $R_{L2}$. Depending on the state of each switch $m_a$, $m_b$, and $m_c$ as well as the polarity of the input voltage $v_a$, $v_b$, and $v_c$, each phase of power can be selectively connected to one of the positive DC output voltage $V_{dc+}$, the negative DC output voltage $V_{dc-}$, or the midpoint voltage $V_m$. By selectively controlling the state of each switch, controller 16 maintains the DC output voltage(s) at desired levels.

Controller 16 includes DC bus regulator 18, DC midpoint regulator 20, duty cycle calculator 22, and PWM generator 24. Controller 16 receives as input the monitored AC input current $i_a$, $i_b$, and $i_c$, the monitored AC input voltage $v_a$, $v_b$, and $v_c$ and the monitored DC output voltages $V_{dc+}$, $V_{dc-}$ and $V_m$. In response, controller 16 generates switching waveforms $s_a$, $s_b$, and $s_c$ that are provided to switches $m_a$, $m_b$, and $m_c$, respectively.

DC bus regulator 18 compares a commanded DC voltage $V_{dc}*$ (i.e., value representing the desired DC output voltage(s)) to the monitored DC voltage(s) $V_{dc}$ and generates in response a commanded voltage vector $v_{abc}*$ that represents the voltage that should be provided to each phase of rectifier 12 to generate the desired DC output voltage. The commanded voltage vector $v_{abc}*$ is represented graphically in a space vector plot shown in FIG. 4, and is used by duty cycle calculator 22 to determine the duty cycles required for each available switching state. DC bus regulator 18 also determines the sector and sub-sector in which the commanded voltage vector $v_{abc}*$ resides. Discussed in more detail with respect to FIG. 5, the sector is defined by the phase angle of the AC input current $i_a$, $i_b$, and $i_c$, and the sub-sector is defined based on the location of the commanded voltage vector $v_{abc}*$. The combination of sector and sub-sector information defines the switch states available to duty cycle calculator 22. In other embodiments, in which unity power factor is desired, then the AC input current $i_a$, $i_b$, and $i_c$ and commanded voltage vector $v_{abc}*$ will be aligned, such that the commanded voltage vector $v_{abc}*$ may be used to define both the sector and sub-sector information.

Duty cycle calculator 22 receives the commanded voltage vector $v_{abc}*$ and the sector and sub-sector data from DC bus regulator 18 (as well as the redundant state duty cycles calculated by DC midpoint regulator 20, discussed in more detail below). In response to these inputs, duty cycle calculator 22 determines the available switch states (based on the sector and sub-sector in which the commanded voltage vector $v_{abc}*$ resides) and the duty cycles of the available switch states required to generate the desired DC output voltage. As discussed in more detail below, each switch state has an effect on the DC midpoint voltage and current. However, redundant switch states (unlike non-redundant switch states) associated with a particular sub-sector affect the DC output voltage in the same way (i.e., both redundant states provide the same DC output voltage), but generate DC midpoint currents of opposite polarity. Because the redundant switch states have the same effect on the DC output voltage, duty cycle generator 22 does not need to calculate the individual duty cycles associated with the redundant switch states, only the duty cycles of the non-redundant switch states, labeled $d_h*$. Partitioning of the duty cycles associated with the individual redundant switch states is performed by DC midpoint regulator 20.

DC midpoint regulator 20 receives inputs that include the monitored DC midpoint voltage $V_m$, the AC input current $i_a$, $i_b$, and $i_c$, sector, sub-sector, and non-redundant switch state duty cycles $d_h$* calculated by duty cycle calculator 22. Midpoint regulator 20 includes one or more control functions directed towards maintaining the midpoint voltage at a desired level (e.g., zero volts). In generally, midpoint regulator 20 determines the current required (i.e., current command) to generate the desired DC midpoint voltage, and based on the current command partitions the duty cycles associated with the redundant switch states accordingly. As discussed above, because the redundant switch states do not affect the DC output voltages any differently (only the DC midpoint current), proper partitioning of the redundant switch states allows DC midpoint regulator 20 to generate the desired midpoint current.

Figure 7:
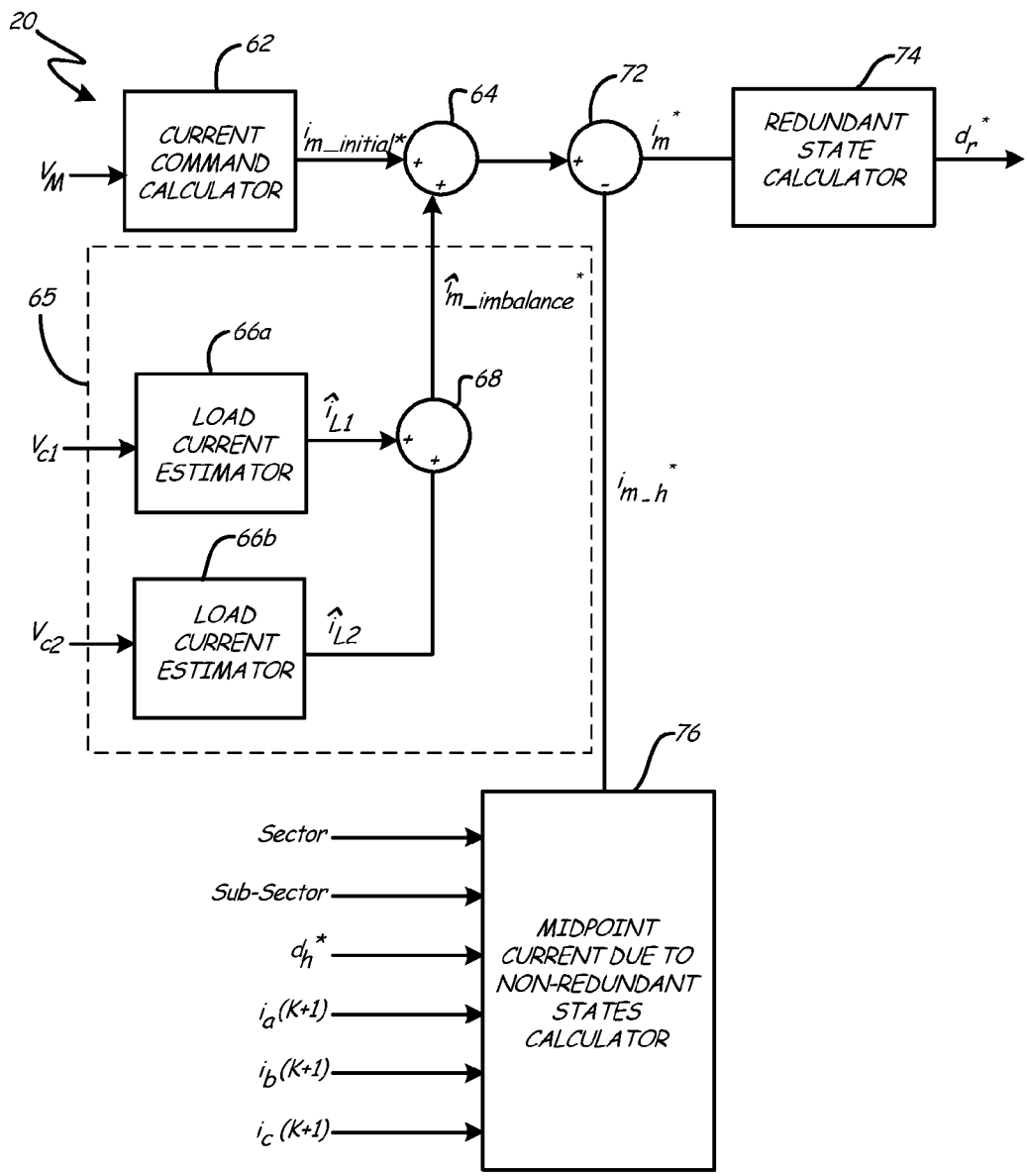
FIG. 7 is a block diagram of functions performed by an exemplary embodiment of DC midpoint regulator.

As described in more detail with respect to FIG. 7, DC midpoint regulator 20 may include traditional control means (such as proportional-integral (PI) control) for controlling the midpoint current based on the monitored DC midpoint voltage $V_m$ (i.e., the midpoint voltage is controlled indirectly by controlling the current flow into the DC midpoint).

In addition, midpoint regulator 20 includes control means that account for the effect non-redundant switch states have on the midpoint current (i.e., the midpoint current generated as a result of the non-redundant switch states). To this end, midpoint regulator 20 receives as input the duty cycles calculated with respect to each switching state by duty cycle calculator 22 and the input currents $i_a$, $i_b$, and $i_c$ provided to rectifier 12. Based on these inputs, the effect of each switch state on the midpoint current $i_m$ is determined and accounted for by midpoint regulator 20. In response to the calculated effect of each switch state on the midpoint current, DC midpoint regulator 20 partitions the duty cycles $d_r$* of the redundant switch states.

The combination of duty cycles for redundant switch states $d_r$* generated by DC midpoint regulator 20 and duty cycles for non-redundant switch states $d_h$* (referred to in combination as duty cycle d*), as well as sector and sub-sector data determined by duty cycle calculator 22 are provided to PWM generator 24. In response, PWM signal generator 24 calculates switching waveforms $s_a$, $s_b$, and $s_c$ to be applied to active components within active rectifier 12, such that the positive DC output voltage $V_{dc+}$, the negative DC output voltage $V_{dc-}$, and the midpoint voltage $V_m$ are regulated as desired.

FIGS. 3A-3H, 4 and 5 illustrate graphically the concept of space vector modulation that is employed in the present invention. In particular, these figures illustrate the difference between redundant and non-redundant switch states, and the selection of possible switching states based on sector and sub-sector information derived from the AC input signals and the commanded voltage vector $v_{abc}$*.

Figure 5:
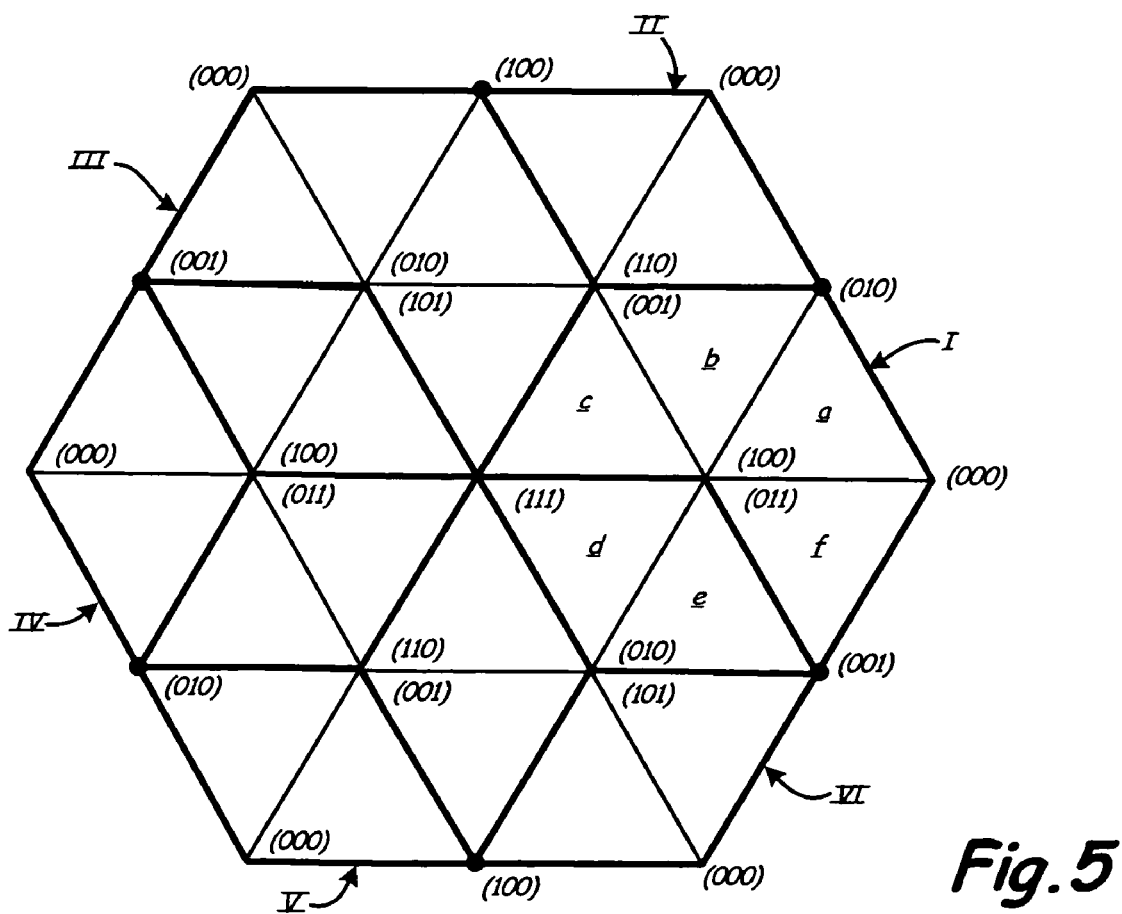
FIG. 5 is a complex vector plot illustrating graphically the positioning of available switch states associated with each phase angle of the AC input current to the multi-level rectifier.

FIGS. 3A-3H illustrate a plurality of potential switch states (i.e., switching configurations) and the flow of current into the positive DC output voltage $V_{dc+}$, the negative DC output voltage $V_{dc-}$, and the midpoint voltage $V_m$ based on a selected switch state. In the Vienna-type rectifier embodiment, the AC input acts as a current source. The locations of the input currents $i_a$, $i_b$ and $i_c$ determine the active sector, thereby defining the available switch states (e.g., as shown in FIG. 5). FIGS. 3A-3H illustrate an example in which input current $i_a$ is of positive polarity and input currents $i_b$ and $i_c$ are of negative polarity. The simplified examples shown illustrate concepts associated with the flow of current in each switch state.

Figure 3A:
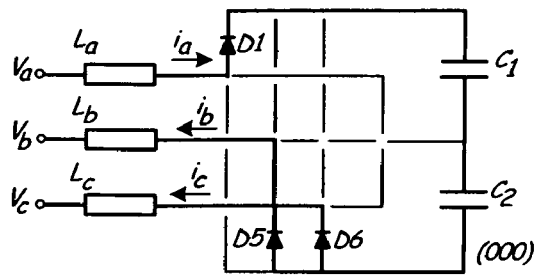
FIG. 3A-3H are simple diagrams illustrating available switch states of the multi-level rectifier and resulting flow of current related to a particular sector.

For example, switch state (000) shown in FIG. 3A defines a switch state in which switches $m_a$, $m_b$, and $m_c$ are "open" or non-conductive, such that current $i_a$ flows into the positive DC output voltage $V_{dc+}$ and currents $i_b$ and $i_c$ (both negative) flow into the negative DC output voltage $V_{dc-}$. Switch state (000) charges capacitor C1 and C2 equally (relatively) and generates no midpoint current flow into the midpoint voltage $V_m$.

Figure 3E:
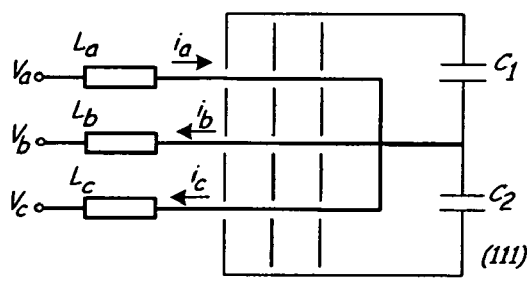
Figure 3B:
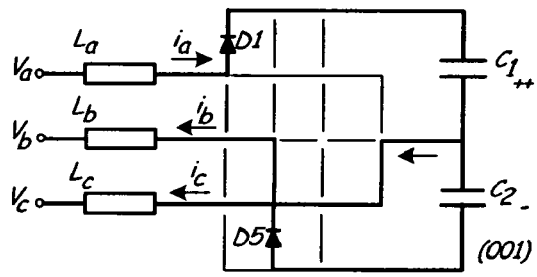

Switch state (001) shown in FIG. 3B defines a switch state in which switches $m_a$ and $m_b$ are open and switch $m_c$ is "closed" or conductive. In this switch configuration current $i_a$ flows into the positive DC output voltage $V_{dc+}$, negative current $i_b$ flows into the negative DC output voltage $V_{dc-}$, and negative current $i_c$ flows through the closed switch $m_c$ into the midpoint voltage $V_m$. Switch state (001) charges capacitor C1 (as indicated by the plus signs adjacent capacitor C1) relative to capacitor C2, which is slightly discharged relative to C1 (as indicated by the minus sign adjacent capacitor C2). In addition, switch state (001) provides a negative midpoint current into the midpoint voltage $V_m$ as indicated by the arrow pointing away from the midpoint voltage.

Figure 3F:
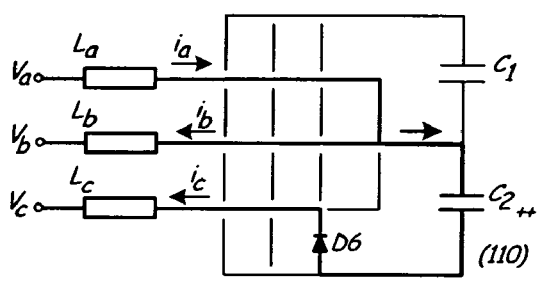
Figure 3C:
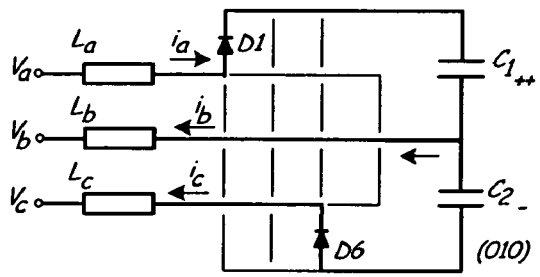

Switch state (010) shown in FIG. 3C defines a switch state in which switches $m_a$ is open, $m_b$ is closed, and switch $m_c$ is open. In this switch configuration current $i_a$ flows into the positive DC output voltage $V_{dc+}$, negative current $i_b$ flows into the midpoint voltage $V_m$, and negative current $i_c$ flows into negative DC output voltage $V_{dc-}$. Switch state (010) also charges capacitor C1 relative to capacitor C2, which is slightly discharged (relative to C1) by the negative flow of current into the midpoint voltage. Once again, switch state (010) provides a negative midpoint current into the midpoint voltage $V_m$ as indicated by the arrow pointing away from the midpoint voltage.

Figure 3G:
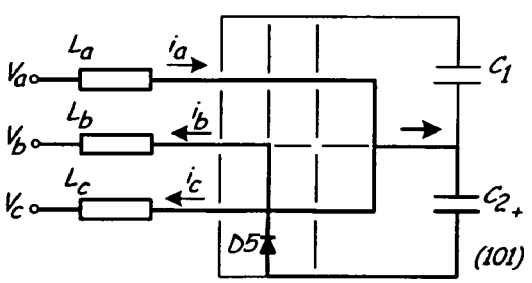
Figure 3D:
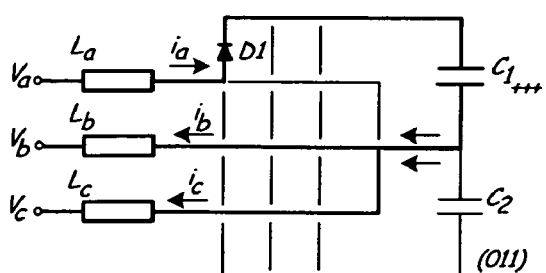

Switch state (011) shown in FIG. 3D defines a switch state in which switches $m_a$ is open, and switches $m_b$ and $m_c$ are closed. In this switch configuration current $i_a$ flows into the positive DC output voltage $V_{dc+}$, and negative current $i_b$ and $i_c$ flows into the midpoint voltage $V_m$. Switch state (011) charges capacitor C1 relative to capacitor C2 (as indicated by the plus signs located adjacent to capacitor C1) due to a combination of the positive current that flows into the positive DC voltage $V_{dc+}$ and the negative currents that flow into the negative DC voltage $V_{dc-}$. In addition, negative currents $i_b$ and $i_c$ both flow into the midpoint voltage $V_m$, resulting in a higher magnitude negative midpoint current $i_m$ than the resulting midpoint currents illustrated in FIGS. 3B and 3C (as illustrated by the two arrows pointing away from the midpoint voltage in FIG. 3D as opposed to single arrows points away from the midpoint voltage in FIGS. 3B and 3C).

Switch state (111) shown in FIG. 3E defines a switch state in which switches $m_a$, $m_b$, and $m_c$ are closed. In this switch configuration all three currents flow into the midpoint. As a result, no net flow of current (in general) is provided to the midpoint voltage $V_m$ (as indicated by the lack of an arrow pointing either into or away from the midpoint voltage).

Switch state (110) shown in FIG. 3F defines a switch state in which switches, $m_a$ and $m_b$ are closed, and switch $m_c$ is open. In this switch configuration positive current $i_a$ flows into the midpoint voltage $V_m$, negative current $i_b$ flows into the midpoint voltage $V_m$, and negative current $i_c$ flows into the negative DC output voltage $V_{dc-}$. Switch state (110) results in capacitor C2 being charged relative to capacitor C1 (as indicated by the plus signs located adjacent capacitor C2), and a positive midpoint current being provided to midpoint voltage $V_m$ as indicated by the arrow pointing into the midpoint voltage.

Switch state (101) shown in FIG. 3G defines a switch state in which switch $m_a$ is closed, switch $m_b$ is open, and switch $m_c$ is closed. In this switch configuration positive current $i_a$ flows into the midpoint voltage $V_m$, negative current $i_b$ flows into the negative DC output voltage $V_{dc-}$, and negative current $i_c$ flows into the midpoint voltage $V_m$. Switch state (101) results in capacitor C2 being charged relative to capacitor C1 (as indicated by the plus sign located adjacent capacitor C2) and a positive midpoint current being provided midpoint voltage $V_m$ as indicated by the arrow pointing into the midpoint voltage.

Figure 3H:
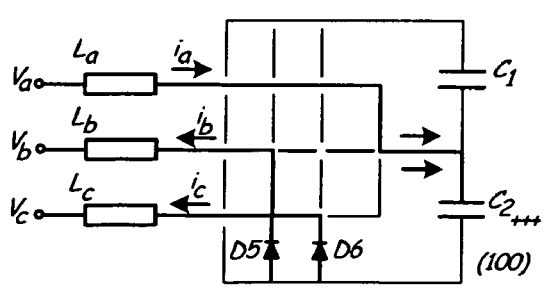

Switch state (100) shown in FIG. 3H defines a switch state in which switch $m_a$ is closed, and switches $m_b$ and $m_c$ are open. In this switch configuration current $i_a$ flows into the midpoint voltage $V_m$, and negative currents $i_b$ and $i_c$ flow into the negative DC output voltage $V_{dc-}$. Switch state (100) charges capacitor C2 relative to capacitor C1 (as indicated by the plus signs located adjacent to capacitor C2) due to a combination of the positive current that flows into the midpoint voltage $V_m$ and the negative currents that flow into the negative DC voltage $V_{dc-}$. In addition, positive current $i_a$ flows into the midpoint voltage $V_m$ (in contrast with FIGS. 3F and 3G, in which the positive current $i_a$ was offset by a negative current generated by $i_b$ and $i_c$). As a result, a higher magnitude positive midpoint current $i_m$ is generated into the midpoint voltage as indicated by the double arrows shown in FIG. 3H. In addition, the same overall output voltage is generated in FIG. 3H as is generated in FIG. 3D, with the only difference being the capacitor that receives the charging power. In this way, switching states (011) and (100) are redundant switch states. That is, both states have the same overall effect on the DC output voltage, but provide an opposite effect on the midpoint current.

The examples shown in FIGS. 3A-3H illustrate the effect each switch state has on the DC output voltages and the midpoint current. In particular, three of the switch states (001), (010), and (111) provide no common mode voltage and two switch states (111) and (000) produce no midpoint current. In addition, two of the switch states (100) and (011) are redundant states in that they provide the same or redundant overall effect on the DC voltage as one another, but generate midpoint currents that flow in opposite directions. Prior art methods of controlling the midpoint voltage have partitioned the duty cycle between the redundant states to adjust the midpoint voltage. However, as shown in FIGS. 3A-3H, switching states (110), (010), (101), and (001) also affect the midpoint current. The present invention seeks to incorporate the midpoint current generated by these switch states into the control of the redundant switch states to accurately control the midpoint voltage.

Figure 4:
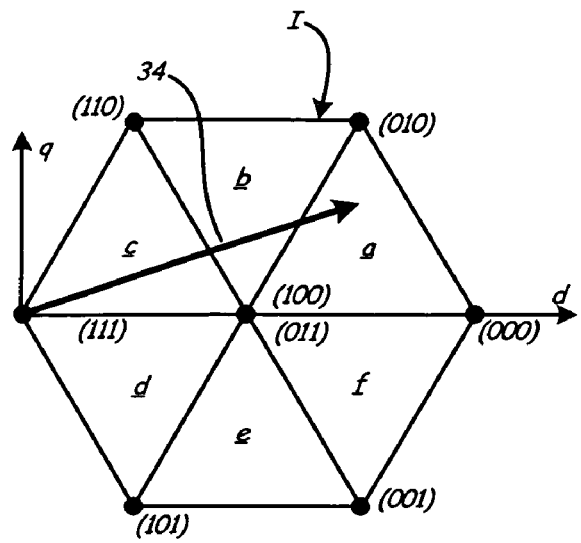
FIG. 4 is a complex vector plot illustrating graphically the positioning of available switch states related to a particular sector.

FIGS. 4 and 5 are complex vector plots (two-dimensional) illustrating graphically the effect each switch state has on the input voltage assuming a constant, balanced dc bus ($V_m=0$). In particular, FIG. 4 is a vector plot illustrating a single sector defined by switching states illustrated in FIGS. 3A-3H. FIG. 5 is a vector plot illustrating sectors (labeled sectors I-VI) corresponding with each possible phase of AC input current $i_a$, $i_b$, and $i_c$. Each vector plot is described in the direct-quadrature (d-q) stationary reference frame, which is a reference frame that is commonly used to simplify calculations involving three phase AC inputs.

FIG. 4 illustrates a single sector I (e.g., hexagonal shape) defined on the periphery by available switch states, the location of which is determined based on the effect each switch state has on the AC input voltage (as represented in the d-q reference frame). In particular, non-redundant switch states (including states (111), (101), (001), (000), (010), and (110)) are defined around the periphery of sector I. Redundant switch states (100) and (011), both of which have the same effect on the AC input voltage, are located at the same position within the interior of sector I. Each switch state is connected to adjacent switch states by a line indicating possible transitions between switch states.

FIG. 4 also illustrates the use of commanded voltage vector $v_{abc}^*$ (illustrated by vector 34) in selecting the switch states and associated duty cycles required to generate the desired DC output voltage. In particular, the input current vector determines the sector (hexagonal shape) and the commanded voltage vector $v_{abc}^*$ determines the sub-sector (triangular shapes, labeled 'a', 'b', 'c', 'd', 'e', and 'f') of available switch states. In the example shown in FIG. 4, commanded voltage vector $v_{abc}^*$ is located in sub-sector 'a'. As a result, the available switch states (i.e., the switch states required to generate the desired DC output voltage) are defined by the switch states located on the periphery of sub-sector 'a', including non-redundant switch states (010) and (000) and redundant switch states (100) and (011).

In an exemplary embodiment, switching states are traversed in such a way as to only require changing the state (i.e., whether a switch is on or off) of one active component (i.e., switching element) with each state transition (e.g., transitioning from state (010) to state (000)). By controlling the duty cycles associated with the available switch states, the DC output voltage(s) is controlled as desired. In addition, by controlling the duty cycles of the redundant states, the midpoint current can be controlled as desired. The present invention accounts for the effect the non-redundant states have on the midpoint current in determining the duty cycle for the redundant states. That is, the present invention partitions the duty cycles of the redundant states based, at least in part, on the midpoint current generated by the non-redundant states such that the midpoint voltage is controlled as desired.

FIG. 5 illustrates a complex space vector plot (two-dimensional) that illustrates all available sectors I-VI. That is, whereas FIG. 4 illustrated a single sector corresponding with a particular location of the AC input current, FIG. 5 illustrates sectors corresponding with all possible phases of the AC input current. As the phase angle of the AC input current changes, different sectors will be employed to control the DC output voltage. In an exemplary embodiment in which one of the control goals is to maintain unity power factor, in which the angle of the input current and input voltage are equal, the commanded voltage vector $v_{abc}^*$ will rotate through each of the sectors illustrated in FIG. 5. In other embodiments, a sector is defined by the boundary associated with larger, triangular shapes. For instance, a sector may be defined as including sub-sectors a, b, and c, as well as the triangle located above sub-sector b. Either method of defining sectors is appropriate, although the definition of the sector must be used consistently throughout controller 16.

Figure 6:
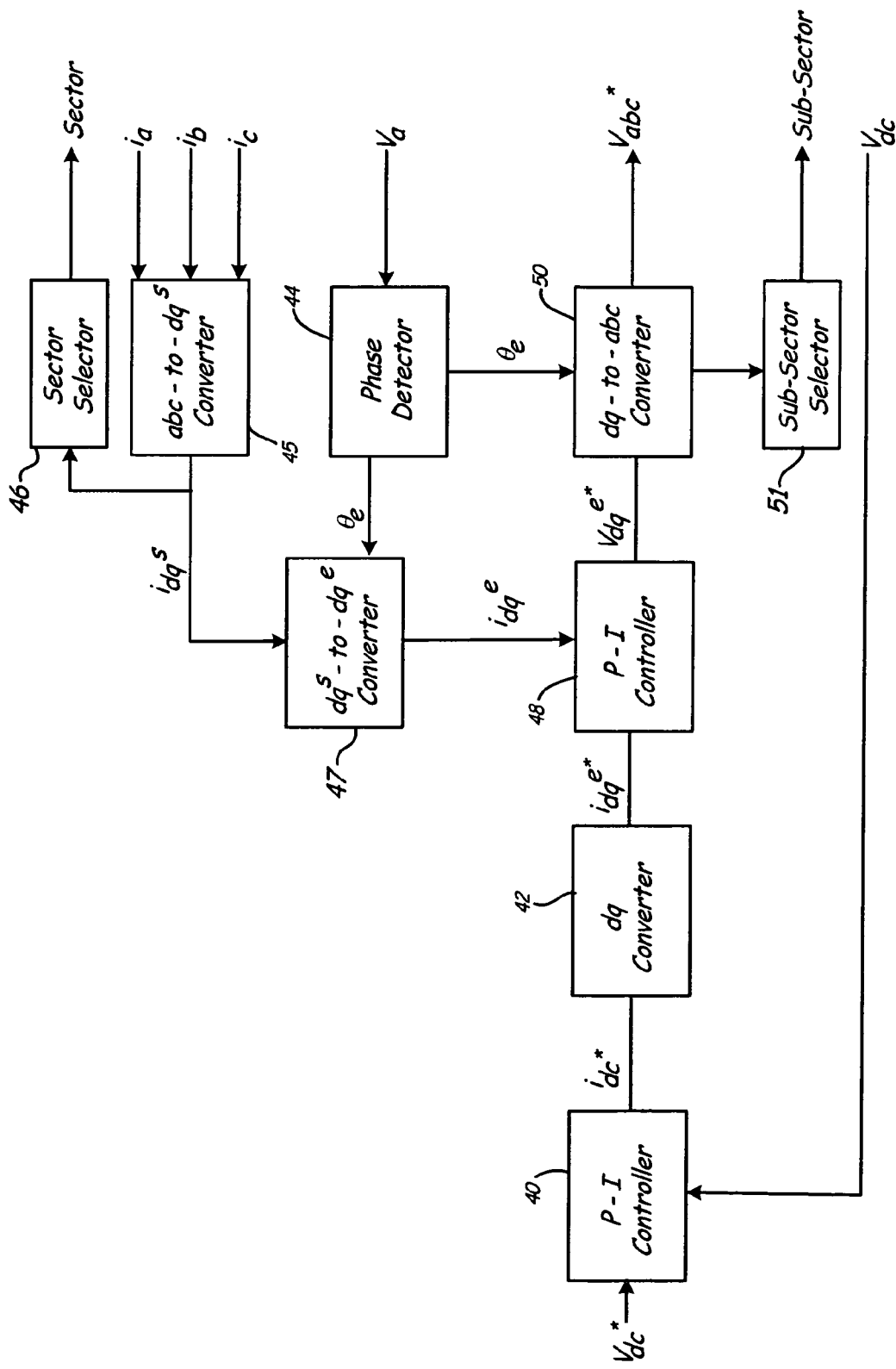
FIG. 6 is a block diagram of functions performed by an exemplary embodiment of a DC bus regulator.
Figure 8:
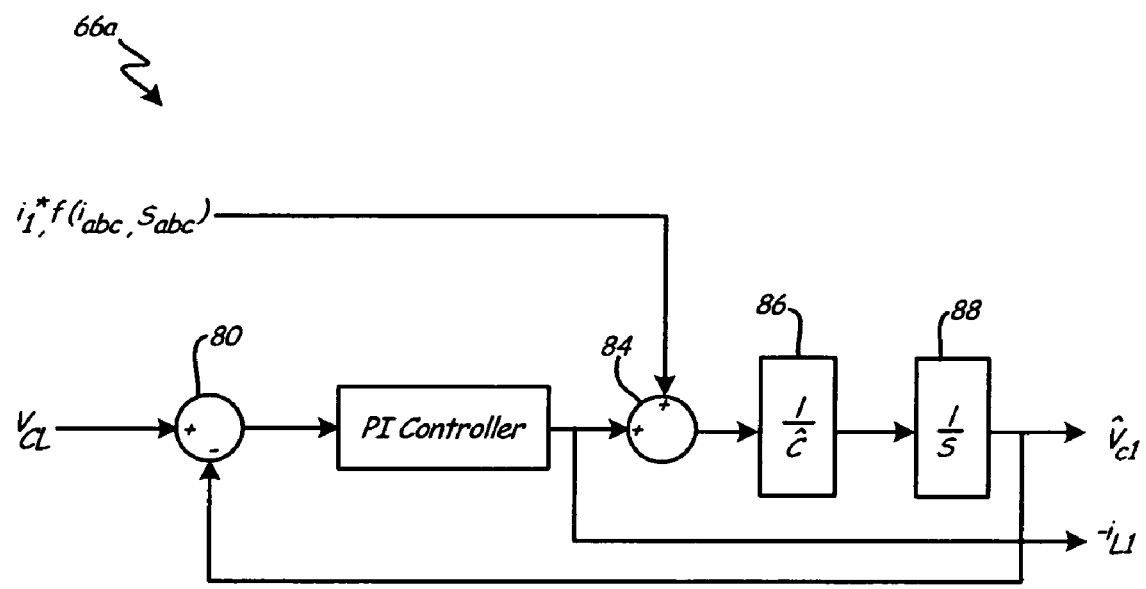
FIG. 8 is a block diagram of functions performed by an exemplary embodiment of a midpoint current observer.

FIGS. 6-8 illustrate exemplary embodiments of operations performed by controller 16 in determining the effect non-redundant states will have on the midpoint current. In response, controller 16 partitions the duty cycles of the redundant switch states to control the midpoint current, and thus, the midpoint voltage as desired.

FIG. 6 is a block diagram illustrating an exemplary embodiment of functions performed by DC bus regulator 18 to control the DC output of rectifier 12 based on monitored AC input currents $i_a$, $i_b$, and $i_c$, and DC output voltages $V_{dc+}$, $V_{dc-}$ and $V_m$. Functions include proportional-integral (PI) controller 40, dq converter 42, phase detector 44, abc-to-$dq^s$ converter 45, sector selector 46, $dq^s$-to-$dq^e$ converter 47, PI controller 48, dq-to-abc converter 50, and sub-sector selector 51. The monitored DC output voltage $V_{dc}$ is compared to a desired or commanded DC voltage value $V_{dc}^*$ by P-I controller 40. In response, P-I controller 40 generates a commanded DC current $i_{dc}$* that represents the current required to generate the desired DC output voltage. The commanded DC current $i_{dc}$* is converted to the synchronous dq reference frame by dq converter 42 to generate synchronous frame current command $i_{dq}^{e}$*. This conversion from the abc reference frame to the synchronous dq reference simplifies the control operations required to generate the commanded voltage vector $v_{abc}$*.

At least one phase of AC input voltage is monitored by phase detector 44 to detect the phase $\theta_e$ of the AC input voltage. Based on the monitored AC input current $i_a$, $i_b$, and $i_c$ and phase data $\theta_e$, the AC input currents are converted to the stationary dq reference frame $i_{dq}^{s}$ by abc-to-dq$^s$ converter 45. The stationary dq reference frame representation of the AC input current is employed by sector selector 46 to determine the active sector (i.e., the sector in which the AC input current is operating). The extracted sector data is provided as an input to duty cycle calculator 22. In embodiments in which unity power factor is desired, then the AC input current and the commanded voltage vector $v_{abc}$* will be aligned such that the commanded voltage vector $v_{abc}$* can be used to define both the sector and the sub-sector.

In addition, the stationary reference frame representation of the AC input current is converted to the synchronous dq reference frame by dq$^s$-to-dq$^e$ converter 47. The resulting synchronous reference frame representation of the AC input current $i_{dq}^{e}$ is compared to the synchronous frame current command $i_{dq}^{e}$* by P-I controller 48 to generate a synchronous reference frame voltage command $V_{dq}^{e}$*, which is converted to the abc reference frame by dq-to-abc converter 50. In this way, commanded voltage vector $v_{abc}$* is generated, dictating the AC input voltage required at each phase of multi-level rectifier 12 to generate the desired DC output voltage $V_{dc}$*. By measuring both the angle of the AC input voltage (e.g., monitoring the angle of an input such as the input voltage $v_a$) and monitoring the AC input currents $i_a$, $i_b$, and $i_c$, DC bus regulator 18 can also provide power factor correction as desired.

The sub-sector in which the commanded voltage vector $v_{abc}$* resides is determined by-sub-sector selector 51 based on the magnitude and direction of the commanded voltage vector $v_{abc}$*. The sub-sector data is also provided as an input to duty cycle calculator 22.

In addition, based on the input current and voltage command vector $v_{abc}$*, both the sector and sub-sector within the complex space vector plot shown in FIG. 5 can be determined. Based on the determined sector and sub-sector (e.g., sector I and sub-sector a as shown in FIG. 4A) duty cycle calculator 22 (as shown in FIG. 2) determines the switch states available, and partitions the duty cycles $d_n$* associated with each non-redundant switch state based on the voltage command vector $v_{abc}$*. The combined duty cycles of the redundant switch states may also be determined by duty cycle calculator 22, although the individual duty cycles associated with each redundant switch state are determined by DC midpoint regulator 20.

FIG. 7 is a block diagram illustrating an exemplary embodiment of DC midpoint regulator 20, which includes current command calculator 62, summer 64, load current decoupler 65, which includes load current estimators 66a and 66b and summer 68, midpoint current due to non-redundant states calculator 76, comparator 72 and redundant state calculator 74.

Current command calculator 62 receives as input the monitored midpoint voltage $V_m$. Although expressed as a measurable or observed quantity, midpoint voltage $V_m$ may be generated based on monitoring of only the positive DC voltage $V_{dc+}$ and the negative DC voltage $V_{dc-}$. In applications in which the midpoint voltage $V_m$ is maintained at a voltage approximately midway between the positive DC voltage $V_{dc+}$ and the negative DC voltage $V_{dc-}$, the difference between the positive DC voltage $V_{dc+}$ and the negative DC voltage $V_{dc-}$ will approximate the midpoint voltage $V_m$. Based on the monitored DC midpoint voltage $V_m$, the magnitude of the current required to maintain the midpoint voltage at a desired value is determined. In an exemplary embodiment, current command calculator 62 may take into account the capacitance of capacitive elements C1 and C2, as well as the switching period associated with active components within multi-level rectifier 12 in determining the magnitude of the current required to maintain the midpoint voltage at a desired level. An integral path may be added to account for errors in the estimation of the capacitance or other parameters. In prior art methods, a control scheme such as that described with respect to current command calculator 62 was typically used alone to regulate the midpoint voltage. That is, the prior art would react to detected imbalances or build-ups of voltage at the DC midpoint, and generate a midpoint current command required to remove the detected DC midpoint voltage.

The present invention employs additional control schemes (used alone or in conjunction with a typical P-I controller such as current command calculator 62) for improving the control of the DC midpoint voltage $V_m$. In particular, load current estimators 66a and 66b improve the ability of controller 16 to handle current imbalances caused by load 14, and in particular allows for load imbalances to be accounted for in generating a current command. In an exemplary embodiment (shown in FIG. 8), a DC voltage observer can be used to estimate the load current (e.g., $i_{L1}$ and $i_{L2}$ based on the measured capacitor voltage $V_{c1}$, measured input current $\hat{i}_1$, and the input switch state $s_{abc}$. In an exemplary embodiment, load current estimators 66a and 66b may be combined into a single unbalanced load current estimator, thereby reducing the computational requirements at the expense of additional state information. In other embodiments, the load current estimator generates estimates based only on the switch states, estimating both the midpoint voltage and current.

The load currents $i_{L1}$, $i_{L2}$ indicate the magnitude of the current drawn by the load. If conditions are balanced, then the load current $i_{L1}$ drawn from capacitor C1 will equal the load current $i_{L2}$ drawn from capacitor C2, and the load currents will cancel out when combined by summer 68. If an unbalance exists between the load currents, then the effect on the midpoint current is accounted for by providing the detected unbalance to redundant state calculator 74. In an exemplary embodiment shown in FIG. 7, the unbalanced load $i_{m\_unbalanced}$ is combined with the current command $i_{m\_initial}$* generated by current command calculator 62, and the sum is provided to redundant state calculator 74.

In the exemplary embodiment shown in FIG. 7, current command calculator 62 thus generates an initial current command based on the monitored midpoint voltage, and load current estimators 66a and 66b take into account unbalanced load currents drawn from the load. Midpoint current due to non-redundant states calculator 70 takes into account the midpoint current generated as a result of non-redundant switching states. Each of these control loops may be used alone or in combination with one another, as required by the application.

As discussed with respect to FIGS. 3A-3H, a number of switch states inject current into the midpoint voltage that is not accounted for by the other control means. In general, calculator 70 determines based on the current sector, sub-sector, duty cycles associated with the non-redundant states $d_h^*$, and the estimated or anticipated AC input current in the next time step $i_a(k+1)$, $i_b(k+1)$, and $i_c(k+1)$ the resulted midpoint current. As a result, the midpoint current $i_{m-h}^*$ added by the non-redundant switch states is combined with the initial current command $i_{m\_initial}^*$ to generate a final midpoint current command $i_m^*$. In particular, estimating the expected current $i_a(k+1)$, $i_b(k+1)$, and $i_c(k+1)$ and knowledge regarding the duty cycles to be applied in the next time step (as generated by duty cycle calculator 22 shown in FIG. 2) allows midpoint current calculator 70 to calculate the effect each non-redundant state will have on the midpoint current. Although the embodiment illustrated in FIG. 7 makes use of expected currents, in other embodiments the measured or monitored current may be employed to reduce computational complexity.

The following is an exemplary embodiment of the calculations performed by midpoint current calculator 70. Matrices provide a simple method of illustrating the operations performed, although it is understood that the matrices are only representative of the calculations performed by midpoint current calculator 70. Equations 1-3 illustrate the equations used to generate the midpoint current estimation for three of the six sectors, with equations 4-6 representing calculations for the remaining sectors as they relate to the first three sectors. Each of the equations is represented based on a selection of both sector and sub-sector information. The terms $d_0$, $d_1$, $d_2$, and $d_3$ represent the duty cycles associated with each switch state (as opposed to the duty cycles of the switches themselves). Redundant switch states are identified based on the sector in which the commanded voltage resides. For instance, with respect to Sector I, duty cycles $d_0$ and $d_3$ correspond with redundant states (100) and (011), respectively. Duty cycles $d_1$ and $d_3$ correspond with non-redundant states (010) and (000).

$$i_{mI} = \begin{Bmatrix} i_{mIa} \\ i_{mIb} \\ i_{mIc} \\ i_{mId} \\ i_{mIe} \\ i_{mIf} \end{Bmatrix} = \begin{bmatrix} (d_0-d_3) & d_2 & 0 \\ (d_0-d_3) & d_2 & -d_1 \\ (d_0-d_3) & 0 & -d_1 \\ (d_0-d_3) & -d_1 & 0 \\ (d_0-d_3) & -d_1 & d_2 \\ (d_0-d_3) & 0 & d_2 \end{bmatrix} \begin{Bmatrix} i_a \\ i_b \\ i_c \end{Bmatrix} \quad (1)$$

$$= \begin{bmatrix} i_a & 0 & i_b & -i_a \\ i_a & -i_c & i_b & -i_a \\ i_a & -i_c & 0 & -i_a \\ i_a & -i_b & 0 & -i_a \\ i_a & -i_b & i_c & -i_a \\ i_a & 0 & i_c & -i_a \end{bmatrix} \begin{Bmatrix} d_0 \\ d_1 \\ d_2 \\ d_3 \end{Bmatrix}$$

$$i_{mII} = \begin{Bmatrix} i_{mIIa} \\ i_{mIIb} \\ i_{mIIc} \\ i_{mIId} \\ i_{mIIe} \\ i_{mIIf} \end{Bmatrix} = \begin{bmatrix} 0 & d_1 & (d_3-d_0) \\ d_1 & 0 & (d_3-d_0) \\ d_1 & -d_2 & (d_3-d_0) \\ 0 & -d_2 & (d_3-d_0) \\ -d_2 & 0 & (d_3-d_0) \\ -d_2 & d_1 & (d_3-d_0) \end{bmatrix} \begin{Bmatrix} i_a \\ i_b \\ i_c \end{Bmatrix} \quad (2)$$

$$= \begin{bmatrix} -i_c & i_b & 0 & i_c \\ -i_c & i_a & 0 & i_c \\ -i_c & i_a & -i_b & i_c \\ -i_c & 0 & -i_b & i_c \\ -i_c & 0 & -i_a & i_c \\ -i_c & i_b & -i_a & i_c \end{bmatrix} \begin{Bmatrix} d_0 \\ d_1 \\ d_2 \\ d_3 \end{Bmatrix}$$

$$i_{mIII} = \begin{Bmatrix} i_{mIIIa} \\ i_{mIIIb} \\ i_{mIIIc} \\ i_{mIIId} \\ i_{mIIIe} \\ i_{mIIIf} \end{Bmatrix} = \begin{bmatrix} d_2 & (d_0-d_3) & -d_1 \\ d_2 & (d_0-d_3) & 0 \\ 0 & (d_0-d_3) & d_2 \\ -d_1 & (d_0-d_3) & d_2 \\ -d_1 & (d_0-d_3) & 0 \\ 0 & (d_0-d_3) & -d_1 \end{bmatrix} \begin{Bmatrix} i_a \\ i_b \\ i_c \end{Bmatrix} \quad (3)$$

$$= \begin{bmatrix} i_b & -i_c & i_a & -i_b \\ i_b & 0 & i_a & -i_b \\ i_b & 0 & i_c & -i_b \\ i_b & -i_a & i_c & -i_b \\ i_b & -i_a & 0 & -i_b \\ i_b & -i_c & 0 & -i_b \end{bmatrix} \begin{Bmatrix} d_0 \\ d_1 \\ d_2 \\ d_3 \end{Bmatrix}$$

$$i_{mIV} = -i_{mI} \quad (4)$$

$$i_{mV} = -i_{mII} \quad (5)$$

$$i_{mVI} = -i_{mIII} \quad (6)$$

For example, if the input current vector resides in Sector I, Equation 1 is employed to define the midpoint current. In particular, if the commanded voltage vector $v_{abc}^*$ resides in sub-sector a (corresponding with the example shown in FIG. 4A), then the first row of currents $\{i_a, 0, i_b, -i_a\}$ are multiplied by the right-most column of duty cycles to generate the following calculation of midpoint current:

$$i_m(\text{Sector } I, \text{Sub-sector } a) = d_0 i_a + d_2 i_b - d_3 i_a \quad (7)$$

The midpoint current generated by equation 7 is consistent with the modeled effect each switch state has on the midpoint current as illustrated with respect to FIGS. 3A-3F. Redundant switch states (100) and (011) and their corresponding duty cycles $d_0$ and $d_3$ affect the midpoint voltage in the opposite direction. Non-redundant switch state (000) and corresponding duty cycle $d_1$ do not affect the midpoint current at all, and non-redundant switch state (010) and corresponding duty cycle $d_2$ generate a positive midpoint current.

Midpoint calculator 70 therefore receives inputs describing the sector and sub-sector in which the commanded voltage vector $v_{abc}^*$ resides. Based on these inputs, the appropriate equation (e.g., equations 1-6) can be selected to determine the effect non-redundant switch states will have on the midpoint current. For this calculation, midpoint calculator 70 employs both the anticipated or expected phase current $i_{abc}(k+1)$ and the partitioning of non-redundant duty cycles $d_h^*$ as determined by duty cycle calculator 22 (as shown in FIG. 2). In the above example, duty cycles $d_1$ and $d_2$ (referred to generically in FIG. 2 as $d_h^*$) are specified based on the commanded voltage vector $v_{abc}^*$ to generate the required DC output voltage. Based on the specified duty cycles $d_1$ and $d_2$, the effect the non-redundant duty cycles will have on the midpoint current is determined and provided as output $i_{m-h}^*$.

The midpoint current $i_{m-h}^*$ is provided to redundant state calculator 74 such that the effect of the non-redundant switch states on the midpoint current can be accounted for in the partitioning of the duty cycles of the redundant states. In the exemplary embodiment shown in FIG. 7, the midpoint current $i_{m-h}^*$ is combined with other midpoint current commands (e.g., current command $i_{m\_initial}^*$ generated in response to the monitored DC midpoint voltage and $i_{m\_unbalance}$ generated by load current decoupler 65. The resulting midpoint current command $i_m^*$, which accounts for the effect non-redundant switch states will have on the midpoint current, is provided to redundant state calculator 74 to determine the partitioning of the redundant states (referred to generically in FIG. 2 as duty cycle $d_r^*$) required to generate the desired midpoint current. The calculated redundant state duty cycles $d_r^*$ are provided to duty cycle calculator 22 (as shown in FIG. 2) and subsequently to PWM converter 24 for generation of the switching waveforms $s_a$, $s_b$, and $s_c$ provided to multi-level rectifier 12.

FIG. 8 is a block diagram illustrating an exemplary embodiment of load current estimator 66a that employs a voltage observer to estimate the load current $i_{L1}$. Load current estimator 66a includes comparator 80, controller 82, summer 84, capacitive estimator 86 and differentiator 88.

Voltage $V_{c1}$ measured at one of the capacitors (in this case, across capacitor C1 as shown in FIG. 2) is compared with the estimated or anticipated voltage across capacitor C1, labeled $\hat{V}_{c1}$. The difference between the measured and anticipated voltage is provided to controller 82 (e.g., proportional-integral (P-I) controller) to convert the voltage value to a value representative of the current drawn by the load, labeled $-i_{L1}$, which is provided as an output of load current estimator 66a.

In addition, based on the switching waveforms $s_a$, $s_b$, and $s_c$ applied to multi-level rectifier 12 and the AC input current $i_a$, $i_b$, and $i_c$, the anticipated current $i_1^*$ provided to capacitor C1 can be estimated. The anticipated current $i_1^*$ is combined with the estimated load current $-i_{L1}$ by summer 84. The summed current represents the current expected to flow into capacitor C1. Based on the summed current, capacitance estimator 86 (defined based on the capacitance of capacitor C1) and differentiator 88 convert the summed current to a voltage estimate $\hat{V}_{c1}$ that is provided as feedback to generate the next load current estimate. In this way, the load current $i_{L1}$ drawn from capacitor C1 is estimated. By combining the load current estimate $i_{L1}$ with load current estimate $i_{L2}$, unbalances or disruptions in the load current can be accounted for when calculating the midpoint current command.

Figure 9:
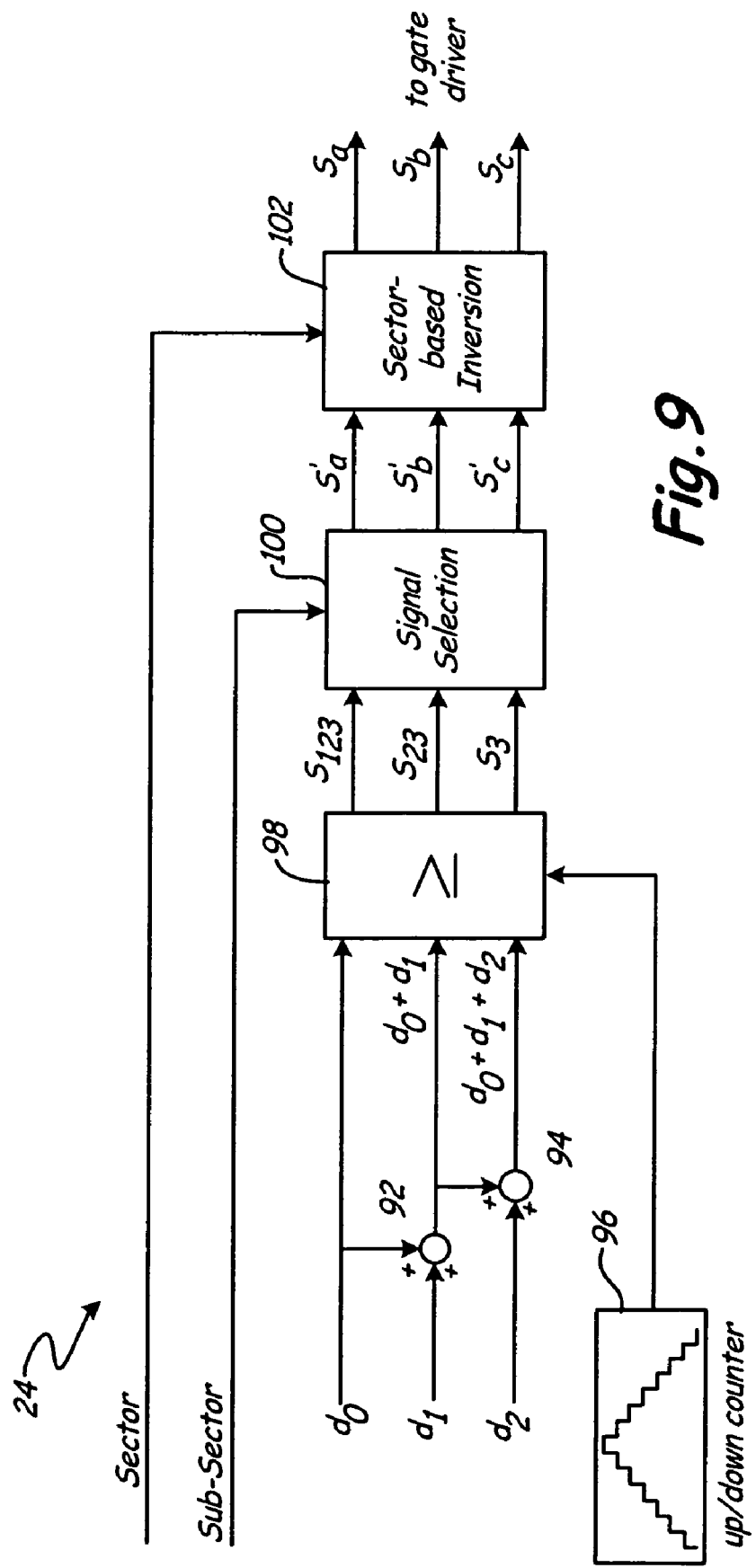
FIG. 9 is a block diagram of functions performed by an exemplary embodiment of a PWM signal generator.

FIG. 9 is a block diagram illustrating an exemplary embodiment of PWM signal generator 24 employed by the present invention to generate switching waveform signals $s_{abc}$ to be applied to multi-level rectifier 12. PWM signal generator 24 includes summing circuits 92 and 94, up/down counter 96, comparator 98, signal selector 100 and sector based inverter 102. PWM signal generator 24 provides an elegant method of converting duty cycles generated with respect to available switch states to switching waveforms $s_a$, $s_b$, and $s_c$ to be applied to multi-level rectifier 12. In particular, PWM signal generator 24 generates switching waveforms that result in the traversal of the switch states such that only one switch component changes states (i.e., on or off) during each switch state transition. The particular logic described with respect to FIG. 9 (and more particularly, in FIGS. 10-12) is based on the division of sectors and sub-sectors as described with respect to FIG. 5. In embodiments in which sectors are defined as shapes other than hexagonal, the specific logic used to generate PWM signals would vary accordingly.

Duty cycles $d_0$, $d_1$, and $d_2$ ($d_3$ can be inferred as occupying any time not taken by duty cycles $d_0$-$d_2$), as discussed above, represent the relative time allocated to each switch state. Duty cycle $d_0$ is provided directly to comparator 98. Duty cycle $d_1$ is added to duty cycle $d_0$, and the resultant sum is provided to comparator 98. The sum of duty cycles $d_0$ and $d_1$ are added to duty cycle $d_2$, and the resultant sum is provided to comparator 98. Each of the inputs provided to comparator 98 is compared with the waveform generated by up/down counter 96. The period of the waveform generated by the up/down counter 96 should represent the period associated with rotating through an entire sub-sector of possible switch states. That is, by shortening the period of the up/down counter waveform, the frequency associated with the switch states will increase.

Figure 10:
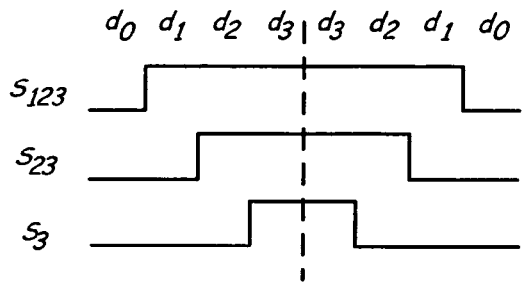
FIG. 10 is a waveform illustrating the generation of intermediate switching waveforms performed by the PWM signal generator.
Figure 11A:
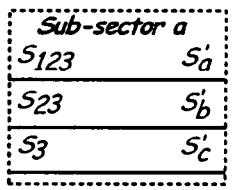
FIGS. 11A-11F are signal routing diagrams illustrating the generation of sub-sector based waveforms by the PWM signal generator.
Figure 11B:
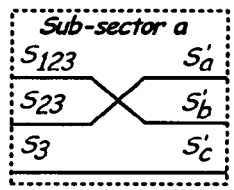
Figure 11C:
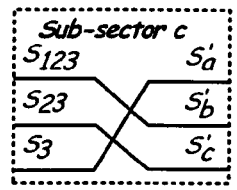
Figure 11D:
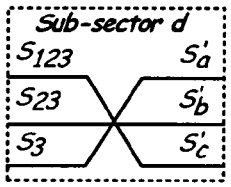
Figure 11E:
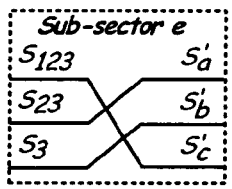
Figure 11F:
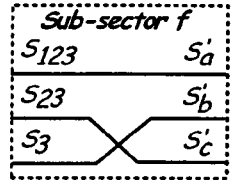
Figure 12A:
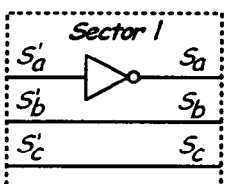
FIGS. 12A-12F are inversion logic diagrams illustrating the generation of sector-based waveforms by the PWM signal generator.
Figure 12B:
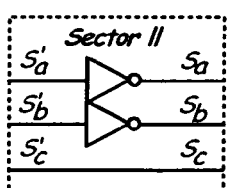
Figure 12C:
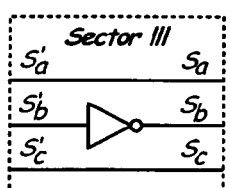
Figure 12D:
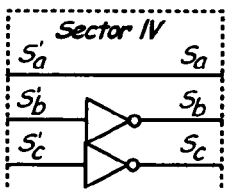
Figure 12E:
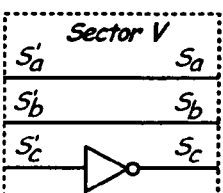
Figure 12F:
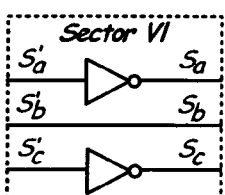

FIG. 10 illustrates the result of the operation performed by comparator 98. In particular, comparing the inputs provided to comparator 98 with the up/down counter waveform results in the illustrated waveforms (labeled $s_{123}$, $s_{23}$ and $s_3$). By selectively summing duty cycles $d_0$, $d_1$, and $d_2$ (i.e., discrete values) and comparing the results to an up/down counter, comparator 98 generates three waveforms (eventually corresponding with the three switches $m_a$, $m_b$, $m_c$ to be controlled) that differentiate between each of the switch states. The waveforms illustrated in FIG. 10 do not represent the waveforms provided to switches within multi-level rectifier 12, but rather represent an intermediate waveform used to generate the desired switching waveforms.

FIGS. 11A-11F represent operations performed by signal selector 100 in modifying the waveforms generated by comparator 98 based on the current sub-sector. In particular, sub-sector information is used to determine the assignment of each waveform generated by comparator 98 to a switch variable $s_a'$, $s_b'$, and $s_c'$. As discussed above, available switch states are determined based on the sub-sector in which the commanded voltage is located.

FIGS. 12A-12F represent operations performed by sector-based inverter 102 modifying the waveforms generated by signal selector 100 based on the current sector. Each signal is inverted as required to cause waveforms to traverse the available switch states properly. In an exemplary embodiment, the operations performed by PWM signal generator 24 generate waveforms that cause only a single switch to change state when transitioning between switch states. For example, using the example shown in FIG. 4A, which is classified as sector I, sub-sector a, the above generated operations would result in a waveform that would traverse the switch states as shown below.

$$100 \rightarrow 000 \rightarrow 010 \rightarrow 011:011 \rightarrow 010 \rightarrow 000 \rightarrow 100 \qquad \text{Equation 9}$$

Each transition between switch states only requires a single digit (i.e., switch ma, mb, mc) to change state. In this way, losses associated with switching operations are minimized. In addition, the required duty cycles associated with the redundant and non-redundant states can be provided to generate the required DC output voltage and midpoint voltage.

The present invention therefore describes a system and method of accounting for the effect non-redundant switch states have on the midpoint current.

Although the present invention has been described with reference to preferred embodiments, workers skilled in the art will recognize that changes may be made in form and detail without departing from the spirit and scope of the invention. In particular, the present invention has been described with respect to a multi-level rectifier. However, the principles associated with taking into account the effect non-redundant switch states have on the midpoint current can be applied to multi-level inverters as well (or more generally, to any multi-level converter employing space vector modulation).

In particular, the present invention may be applied to multi-level rectifiers having more than three levels (e.g., a positive DC rail, a negative DC rail, and at least two intermediate rails). In this type of embodiment, a single midpoint node would be replaced with several intermediate nodes of varying desired voltage values. In response, the present invention would provide a DC intermediate point regulator for each DC intermediate point to be regulated. The DC intermediate point regulator would account for the effect non-redundant switch states have on the intermediate point being regulated, thereby regulating the intermediate point to a desired value.

In addition, the, present invention may be applied not only to multi-level rectifiers, but to multi-level converters in general. For instance, the principles of the present invention may be applied to multi-level inverters, in which a multi-level DC input is converted to an AC output (e.g., three phase output voltage). The principles of the present invention could be applied to an inverter application by accounting for the effect non-redundant switch states have on the current drawn from the DC midpoint node or DC intermediate node.

The invention claimed is:

1. A controller for controlling the operation of a multi-level rectifier that converts an alternating current (AC) input to a direct current (DC) output, the controller comprising:
a DC bus regulator operably connected to monitor the AC inputs and the DC outputs of the multi-level rectifier and to generate in response a commanded voltage vector;
a duty cycle calculator operably connected to receive the commanded voltage vector and to generate, in response to the commanded voltage vector, duty cycles associated with non-redundant switch states; and
a DC midpoint regulator operably connected to receive the non-redundant duty cycles calculated by the duty cycle calculator and to generate in response a first midpoint current command that accounts for an effect the non-redundant switch states have on the midpoint current, wherein the DC midpoint regulator regulates the DC midpoint voltage of the multi-level rectifier to a desired value based, at least in part, on an effect each non-redundant duty cycle has on the midpoint current.

2. The controller of claim 1, wherein the DC bus regulator calculates sector information based on a monitored AC input current and sub-sector information based on the commanded voltage vector.

3. The controller of claim 1, wherein the DC bus regulator calculates sector information and sub-sector information based on the commanded voltage vector.

4. The controller of claim 3, wherein the DC midpoint regulator calculates the midpoint current command based on the duty cycles of the non-redundant switch states, a monitored AC input current, and the sector and sub-sector information calculated by the DC bus regulator.

5. The controller of claim 3, wherein the DC midpoint regulator calculates the midpoint current command based on the duty cycles of the non-redundant switch states, an estimate of the AC input current at a subsequent timestep, and the sector and sub-sector information.

6. The controller of claim 1, wherein the DC midpoint regulator includes:
a redundant state calculator that determines the duty cycles of redundant switch states based, at least in part, on the first midpoint current command signal.

7. The controller of claim 6, wherein the DC midpoint regulator includes:
a midpoint voltage control loop operably connected to monitor the midpoint voltage and to generate a second midpoint current command based on differences between the monitored midpoint voltage and a desired midpoint voltage, wherein the redundant state calculator determines the duty cycles of the redundant switch states based, in addition, on the second midpoint current command signal.

8. The controller of claim 6, wherein the DC midpoint regulator includes:
a load current decoupler operably connected to monitor load currents drawn from the DC output voltage and to detect unbalances in the monitored load currents, wherein the redundant state calculator determines the duty cycles of the redundant switch states based, in addition, on the detected unbalances in the monitored load currents.

9. The controller of claim 1, further including:
a pulse width modulation (PWM) signal generator operably connected to receive duty cycles associated with redundant and non-redundant switch states and operable to generate in response to the redundant and non-redundant switch states switching waveforms to be provided to active components within the multi-level rectifier.

10. The controller of claim 9, wherein the PWM generator generates switching waveforms that result in the traversal of switch states such that only one of the active components within the multi-level rectifier changes state during a transition between switch states.

11. A method of regulating the midpoint voltage of a multi-level rectifier, the method comprising:
monitoring a direct current (DC) output voltage of the multi-level rectifier;
generating, in response to the monitored DC output voltage, a commanded voltage vector;
generating, in response to the commanded voltage vector, duty cycles associated with non-redundant switch states;
estimating a midpoint current generated in response to the duty cycles associated with the non-redundant switch states;
partitioning duty cycles associated with redundant switch states based, at least in part, on the estimated midpoint current;
generating switching waveforms based on the duty cycles associated with the non-redundant switch states and the duty cycles associated with the redundant switch states; and
applying the switching waveforms to active components within the multi-level rectifier.

12. The method of claim 11, further including:
monitoring the midpoint voltage of the multi-level rectifier; and
generating a midpoint current command in response to the monitored midpoint voltage.

13. The method of claim 12, wherein partitioning duty cycles further includes:
partitioning the duty cycles associated with the redundant switch states based, at least in part, on the midpoint current command.

14. The method of claim 11, further including:
generating an unbalanced load current estimate that is combined with the midpoint current estimate generated in response to the duty cycles associated with the non-redundant switch states.

15. The method of claim 14, wherein generating the unbalanced load current estimate includes:
generating a first load current estimate associated with a first load operably connected to a positive DC output of the multi-level rectifier;
generating a second load current estimate associated with a second load operably connected to a negative DC output of the multi-level rectifier; and
combining the first load current estimate with the second load current estimate to generating the unbalanced load current estimate.

16. The method of claim 15, wherein partitioning duty cycles further includes:
partitioning the duty cycles associated with the redundant switch states based, at least in part, on the estimated effect the unbalanced load has on the midpoint current.

17. A multi-level converter comprising:
a plurality of AC signal nodes;
a plurality of DC signal nodes, including at least one intermediate DC voltage node; and
a controller operably connected to monitor the AC signals at the AC signal nodes and the DC signals at the DC signal nodes, including a voltage generated at the at least one intermediate DC voltage node, wherein the controller includes:
  a duty cycle calculator that selects switching states, including both redundant and non-redundant switching states, based on the monitored AC signals and DC signals and partitions duty cycles associated with the non-redundant states based on the monitored AC signals and monitored DC signals;
  an intermediate DC regulator operably connected to receive the non-redundant duty cycles calculated by the duty cycle calculator and to estimate an intermediate current generated into the at least one intermediate DC voltage node in response to the duty cycles of the non-redundant switch states, wherein the intermediate DC regulator partitions the duty cycles associated with the redundant switch states based, at least in part, on the estimated intermediate current generated in response to the non-redundant switch states; and
  a PWM waveform generator operably connected to receive the duty cycles associated with the non-redundant switch states and the duty cycles associated with the redundant switch states and to generate in response switching waveforms that are provided to active components within the multi-level converter to control the intermediate current associated with the at least one intermediate state.

18. The multi-level converter of claim 17, wherein the multi-level converter is a multi-level inverter that converts the DC signals to the AC signals, wherein the intermediate DC regulator estimates the intermediate current drawn from the intermediate node based, at least in part, on the non-redundant switch states selected by the duty cycle calculator, wherein the DC midpoint regulator partitions the duty cycles associated with the redundant switch states based, at least in part, on the estimated intermediate current drawn from the intermediate node in response to the non-redundant switch states.

19. The multi-level converter of claim 17, wherein the multi-level converter is a multi-level rectifier that converts the AC signals to the DC signals, wherein the intermediate DC regulator estimates the intermediate current provided to the intermediate node based, at least in part, on the non-redundant switch states selected by the duty cycle calculator, wherein the DC midpoint regulator partitions the duty cycles associated with the redundant switch states based, at least in part, on the estimated intermediate current provided to the intermediate node in response to the non-redundant switch states.

* * * * *